June 7, 1932.  E. W. CHAFEE  1,862,489
TARGET INDICATOR
Filed Oct. 21, 1927   2 Sheets-Sheet 2
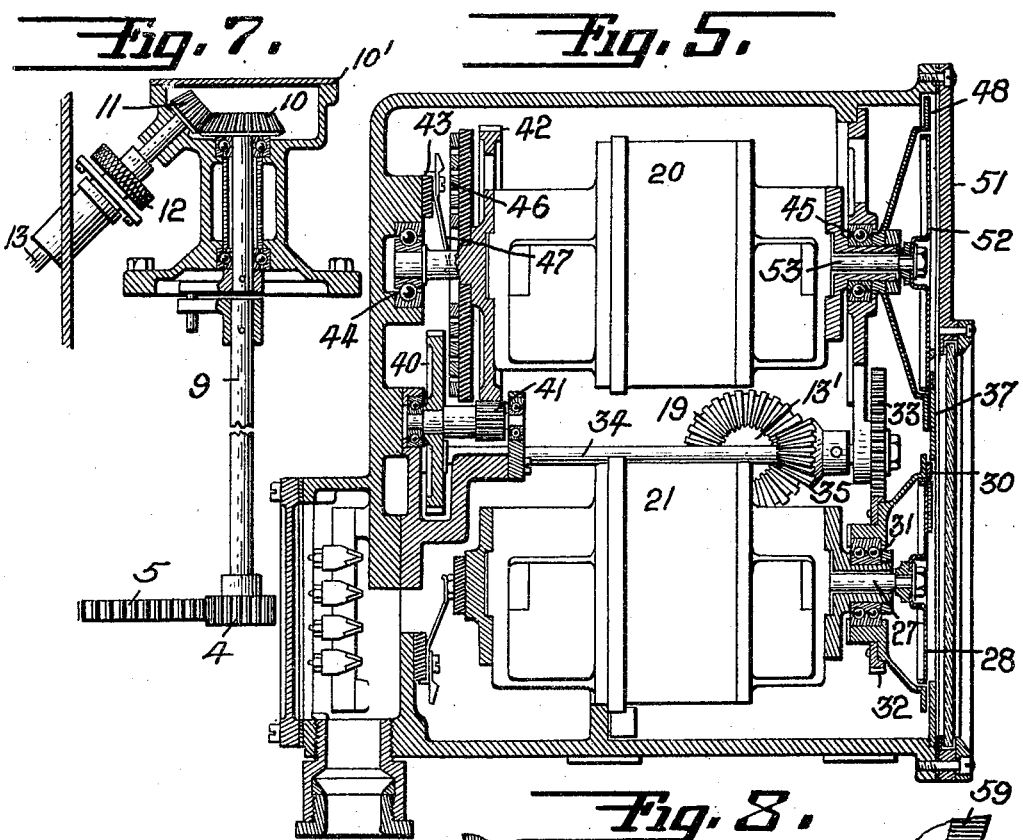
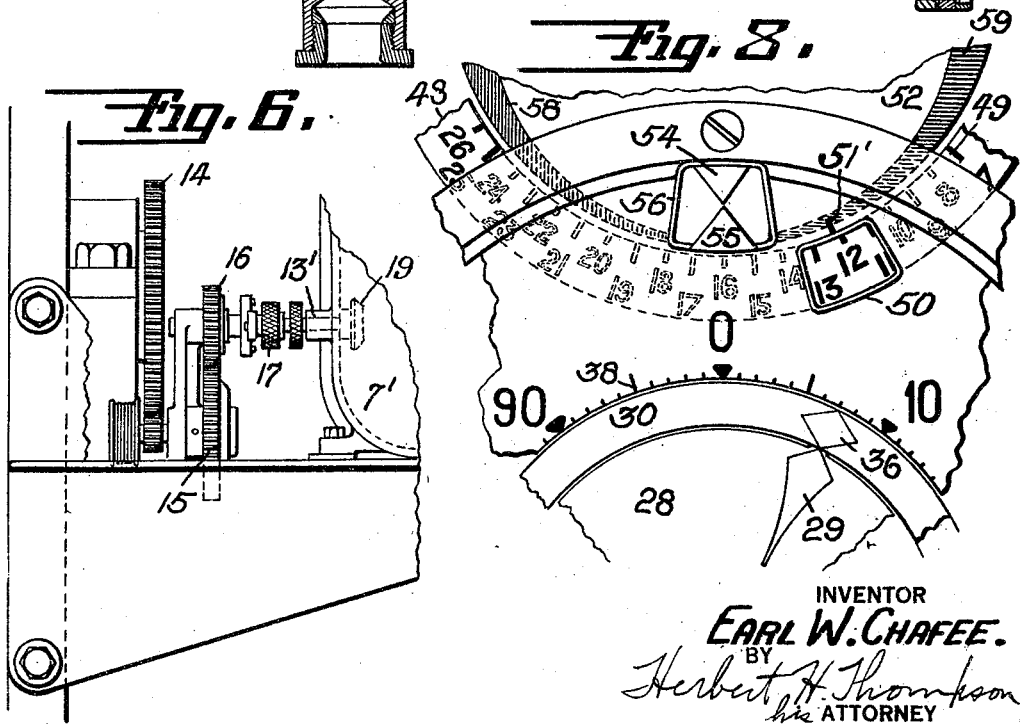
INVENTOR
EARL W. CHAFEE.
BY Herbert H. Thompson
his ATTORNEY Patented June 7, 1932

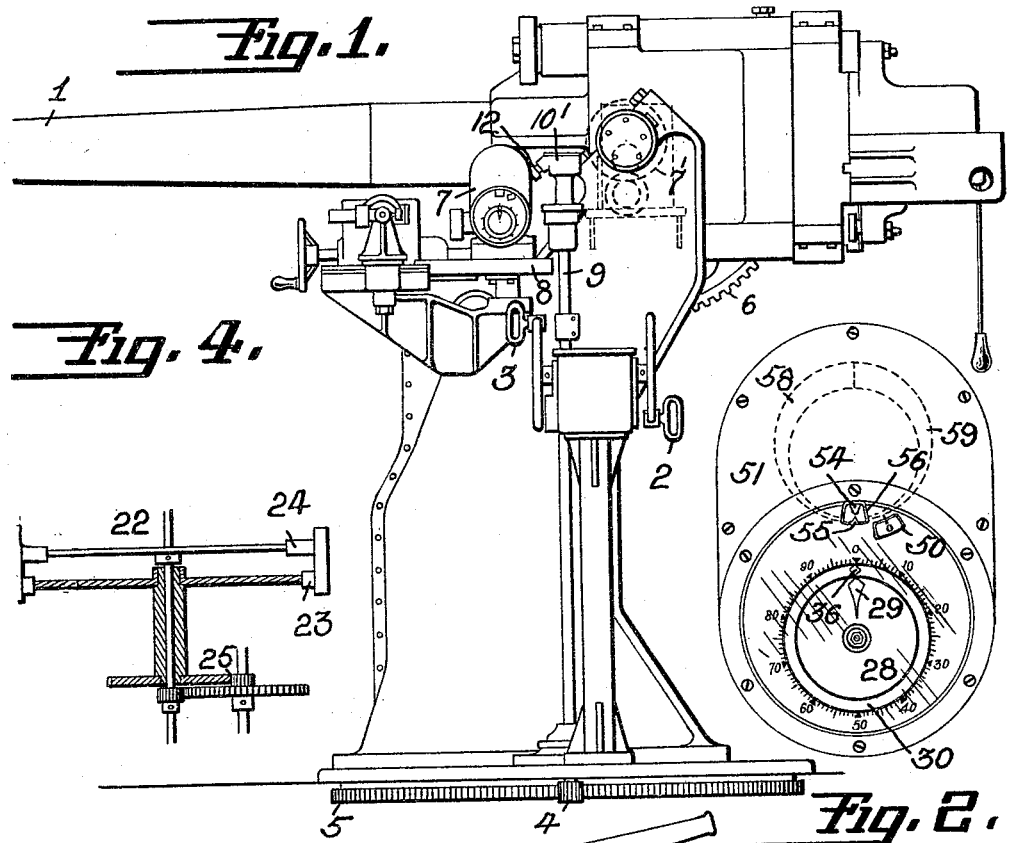
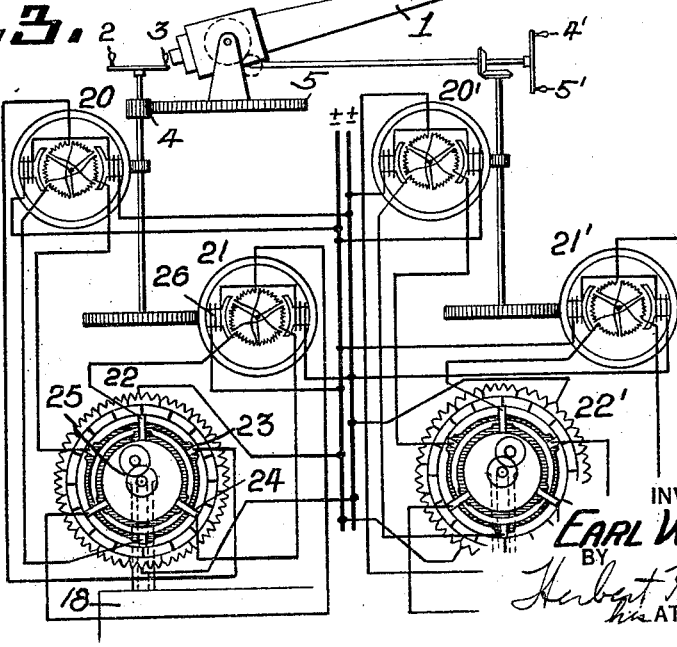

1,862,489

UNITED STATES PATENT OFFICE

EARL W. CHAFEE, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

TARGET INDICATOR

Application filed October 21, 1927. Serial No. 227,843.

This invention relates to gun fire control indicator systems for ordnance and is especially adapted for the control of anti-aircraft ordnance, searchlights and the like, where quickness and accuracy of training of the gun is essential. In the present fire control systems it is usual to have at the gun indicators showing the relative position of the gun and target both in azimuth and in elevation, that is, indicators which show the gunner how to move the gun to get it on the target in both planes. Two such systems of relative position indicators have come into use, known respectively as follow-the-pointer system, wherein one pointer or indicator is actuated from the gun, and another indicator readable with reference to the first indicator is actuated from the target bearing system or computer. Where coarse and fine indicators are employed, two such pairs of pointers or indicators are employed, one coarse and the other fine reading, and one member of each pair being turned from the gun and the other from the computer. In another system which has come into use one index of each pair is stationary and the combined movements of the gun and target differentially actuate the second pair of coarse and fine pointers. This system is generally known as the zero reader, since when the gun is on the target the movable pointer is on the stationary index, or in other words, reads zero. It is found, however, in anti-aircraft work that neither of the present systems is entirely satisfactory, and oftentimes it is found that the operator will become confused as to which is the coarse and which is the fine dial, and also the operator often desires to know the actual angular position of the gun and the target, and the angular rate of movement of the target, which a zero reader does not give him.

According to my invention I propose to obtain the advantage of both the follow-the-pointer and zero reading systems in one instrument and eliminate the disadvantages of both. This I preferably accomplish by constructing the coarse and fine indicators so that one of the pairs of relatively position-indicators operates on the zero reading principle and the other on the follow-the-pointer system. Preferably the coarse reading indicator operates on the zero reading principle and the fine reader on the follow-the-pointer system. In addition I preferably provide a zone indicator in connection with the zero reader indicator which shows approximately the train of the gun or searchlight. The advantages of my invention will become apparent from the following detailed description of one embodiment of the invention and the fact that it is equally applicable to any form of remote control from a sending instrument of the angular position or train of a controlled instrument such as the control from an aeroplane sound detector of a searchlight or beam projector in an anti-aircraft gunnery system or the control from a sight or sound detector of a gun or shell projector.

Referring to the drawings

Fig. 1 shows a side elevation of an anti-aircraft gun with my indicator system applied thereto. Fig. 2 is a face view on a larger scale of one of my improved indicators. Fig. 3 shows an elementary wiring diagram showing the operation of the repeater motors from the target bearing and elevation transmitters. Fig. 4 is a detail of one of the double coarse and fine transmitters. Fig. 5 shows a vertical section of one of my improved indicators. Fig. 6 shows a detail showing how the elevation indicator is turned from the elevation movements of the gun. Fig. 7 shows how the corresponding azimuth indicating instrument is turned from the azimuth movements of the gun. Fig. 8 is an enlarged face view with parts broken away of my indicator.

Referring first to Figs. 1 and 2, the device to be trained or projector, which in this instance is shown as a gun 1 may be controlled either directly by hand or indirectly by remote control in azimuth and in elevation or preferably by both systems. Handles 2 and 3 are shown for the direct control in azimuth or train, said handles operating through pinion 4 on the circular rack 5. Corresponding handles 4' and 5' (not shown in Fig. 1) operate the gun in elevation through gearing 6. One of my indicators 7, namely, the train indicator, is shown mounted on the platform 8 and driven from the turning movements of the gun through shaft 9, bevel pinions 10 and 11 in box 10', clutch 12, and shaft 13 (see Fig. 7). Similarly the other indicator 7' of elevation is driven from the movements of the gun in elevation through gearing 14, 15 and 16, clutch 17 and shaft 13', the latter carrying a bevel gear 19 (Figs. 5 and 6).

Fig. 5 shows the interior of both indicators, as the two indicators may be made substantially identical. Within the indicator are a plurality of repeater or indicator motors preferably of the self-synchronous A. C. induction type. Two motors are shown 20 and 21. The armatures of these motors are driven directly or indirectly from the target bearing instrument, usually from a computing or correction device 18 into which the various corrections are introduced. Said computing device is shown only diagrammatically in Fig. 3 and includes one or more transmitters so arranged as to actuate one of the repeater motors 20 at a one to one ratio with the driving shaft of the sight or sound detector and the other repeater motor 21 at a multiple speed, such as 64 to 1. As shown, a single transmitter 22 of the transformer-generator type is utilized to drive both motors, the different driving ratios being secured by having the brushes 23 for the motor 20 driven at low or one to one speed, and the brushes 24 for the motor 21 driven at high speed by means of step-up gearing 25. A similar double transmitter 22' is provided for the motors 20' and 21' of the elevation indicator 7'. The field 26 of the fine motor 21 is shown as stationary, while the armature shaft 27 carries the dial 28, on which is shown an index 29. Mounted preferably concentrically with said dial 28 is an annular dial 30 journaled in bearing 31 on an extension of the motor frame and driven by means of a gear 32 secured thereto, which meshes with a gear 33 on shaft 34. Said shaft is shown as driven from a bevel pinion 35 meshing with the pinion 19 on shaft 13' (or 13) above referred to.

On dial 30 is also provided an index 36. Index 36, therefore, is driven from the gun and the gearing ratio is such that it is driven at the same multiple speed that the index 29 is driven from the sending instrument. There is also shown provided on the cover or stationary dial 37, graduations 38 which are readable in connection with both the indices 36 and 29. Preferably the dial 37 is graduated into a hundred units representing mils.

The shaft 34 also drives through a pinion (not shown) reduction gearing 40, 41, the latter meshing with a large gear 42 secured to the frame-work or field of the motor 20. Said field is shown as journaled for rotation in the main frame 43 in bearings 44 and 45. Current is shown as introduced thereto by means of a plurality of slip rings 46 and brushes 47. Said frame is shown as carrying at its forward portion a dial 48 which is shown as graduated preferably in mils or hundreds of mils. The gearing ratio is such that the motor field 20 is turned at the same angular velocity as the gun so that the graduations 49 show the gun position in mils. Preferably such graduations are readable through a single window 50 in the top cover 51 on index mark 51'.

Since the armature within the field is positioned by its driving generator with reference to the position of the field, it is evident that by turning the field oppositely to the armature a differential action is secured so that the dial on the armature shaft indicates the relative position of the gun and target and, therefore, constitutes a zero reader. I, therefore, merely provide the dial 52 on the shaft 53 of the armature with an index 54, which is readable upon a stationary index 55 through a window 56. The front cover 51 is shown as extending downwardly so as to cover practically all of both dials 48 and 52 (see Fig. 2), leaving only the indices 54—55 and a graduation 49 of the dial 48 visible through the lower glass window 50. By this means confusion is avoided and a small compact indicator is secured, all of the indications being near one another and yet sufficiently distinct so as to avoid confusion. The graduations 38 are, of course, read in conjunction with the graduation 49, the particular indication shown in Fig. 8 being 1207 mils, namely, twelve hundred mils or 12 on the dial 48 plus seven mils on the vernier dial 38. Preferably also the dial 52, in addition to carrying the index 54, is painted with two bands 58—59 of different colors so that if the operator on looking at his coarse reading zero indicator fails to see the pointer 54 but sees a blue band, for instance, through the window, he will know that he should turn the gun to the left, for instance, or if he sees a red band he knows he has to turn it in the other direction to bring the indicator to zero. Also, to furnish the operator with an indication of his approach to zero the bands may taper off as they approach the index, the bands being shown as crescent shaped. In utilizing my invention, therefore, the operator at the gun, in order to get his gun on the target, first observes the coarse zero reader and moves the gun as just explained until the indicator reads approximately zero. At this time the dial 49 shows him also the zone in which the gun is in. The final position of the gun is secured by observing the follow-the-pointer indicators 29—36 and he moves the gun until the pointer 36 coincides with the pointer 29. As the target moves it is usually only necessary to observe the follow-the-pointer fine reader, since a gunner can usually keep the gun within the hundred mil limit.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a training system having transmitting means, an instrument to be trained also having transmitting means, coarse and fine relative position indicators of target position and the trained instrument train, comprising a coarse zero reader indicator and a fine follow-the-pointer indicator mounted adjacent thereto, and means for driving said indicators jointly from said transmitting means.

2. In a training system, the combination with a target bearing transmitting instrument and a controlled instrument to be trained, of coarse and fine relative position indicators of target position and controlled instrument train, comprising a zero reader indicator and a follow-the-pointer indicator, a one-to-one connection from said controlled instrument and from the target bearing instrument respectively to said coarse indicator, and a multiple speed connection from said controlled instrument and from the target bearing instrument respectively to said fine indicator.

3. In a gun fire control system having target and controlled instrument transmitting means and coarse and fine relative position indicators of target position and the controlled instrument train, comprising a coarse zero reader indicator, a zone angle indicator actuated therefrom, and a fine follow-the-pointer indicator having graduations readable within the zones of said zone indicator and means for driving said indicator jointly from said transmitting means.

4. A target bearing indicator for anti-aircraft guns and the like comprising a target bearing transmitting instrument, a high speed and a low speed repeater motor driven from said instrument, a dial driven by the high speed motor, means driven from the gun, a dial driven at multiple speed from said means adjacent the dial of the high speed motor, differential means connecting said first named means and the low speed motor, and an index dial driven from said last-named means to read zero when the gun is substantially on the target.

5. A target bearing indicator for anti-aircraft guns and the like comprising a target bearing transmitting instrument, a high speed and a low speed repeater motor driven from said instrument, a dial driven by the high speed motor, means driven from the gun, a dial driven at multiple speed from said means adjacent the dial of the high speed motor, differential means connecting said first named means and the low speed motor, an index dial driven from said last-named means to read zero when the gun is substantially on the target, and a graduated dial driven solely from said first-named means.

6. A target training system for a device to be trained comprising a target bearing instrument, a high speed repeater motor, a low speed repeater motor, each motor having the armature thereof driven at a different speed from said target bearing transmitting instrument, a dial driven by the high speed motor, means driven from the trained device, a dial driven at multiple speed from said means adjacent the dial of the high speed motor, means for rotating the field of the low speed motor from said first-named means, and an index driven from the armature of said motor and adapted to read zero when the device is on the target.

7. In a zero reader train indicator for a device to be trained, the combination with a sending instrument and a train device, of an instrumentality operated from the sending instrument, an instrumentality operated from the trained device, an index operated differentially from said instrumentalities and a separate rotatable indicator operated from one only of said instrumentalities to show the angle of train.

8. In a zero reader train indicator for a device to be trained, the combination with a sending instrument and a train device, of an instrumentality operated from the sending instrument, an instrumentality operated from the trained device, an index operated differentially from said instrumentalities and a separate rotatable indicator operated from the second mentioned instrumentality to show the angle of train.

9. A train indicator for devices adapted to be trained on a target, comprising a graduated rotatable indicator driven from the device, a second rotatable indicator having an index, means for driving said first indicator from said device, means for differentially driving said second indicator from the sending instrument and said device, stationary indexes for both indicators, and a cover for both indicators having a window adjacent each stationary index.

10. In a training system, the combination with target bearing and controlled device transmitting means, of coarse and fine relative position indicators of target position and the controlled device train actuated from said means including a coarse zero reader having a rotatable dial with an index thereon and a tapered or crescent shaped band on each side of said index, the two bands being of distinguishable characteristics, for the purpose specified.

11. In a training system, the combination with target bearing and controlled device transmitting means, of a relative position indicator of target position and the controlled device train actuated from said means, including a coarse zero reader having a rotatable dial with an index thereon and a pair of tapered or crescent shaped bands of different colors on the two sides of said index for the purpose specified.

12. In a training system for training an anti-aircraft device upon a moving target, the combination with a target bearing means and the device to be trained, of coarse and fine relative position indicators, of target and train device positions adapted to be located adjacent said device and comprising a coarse zero reader indicator, means for actuating the same at a one-to-one relation from the relative target bearing and device angular positions, and a fine follow-the-pointer indicator mounted adjacent thereto, and means for actuating both pointers thereof at multiple speed from the target bearing and device angular positions.

13. In a training system for training an anti-aircraft device upon a moving target, the combination with a target bearing means and the device to be trained, of coarse and fine relative position indicators of target and train device positions adapted to be located adjacent said device and comprising a coarse zero reader indicator, having only the index thereof visible, means for actuating the same at a one-to-one relation from the relative target bearing and device angular positions, and a fine follow-the-pointer indicator mounted adjacent thereto, being visible over the entire scale, and means for actuating both pointers thereof at multiple speed from the target bearing and device angular positions.

14. A train indicator comprising the combination with the target bearing instrument and trained instrument, of a coarse repeater motor driven at a one-to-one speed from said bearing instrument, a second or fine repeater motor driven at a multiple speed from said bearing instrument, coarse means driven at one-to-one and fine means driven at a multiple speed from said train instrument, and a multi-dial indicator actuated from said motors comprising a pair of follow-the-pointer indicators driven respectively from one of said repeater motors and from one of said driven means, and a stationary and movable index, the latter being driven from the differential movements of the armature of said other repeater motor and said other driven means.

15. A train indicator comprising the combination with the target bearing instrument and trained instrument, of a coarse repeater motor driven at a one-to-one speed from said bearing instrument, a second or fine repeater motor driven at a multiple speed from said bearing instrument, coarse means driven at one-to-one and fine means driven at multiple speed from said train instrument, and a multi-dial indicator actuated from said motors comprising a pair of follow-the-pointer indicators driven respectively from said fine repeater motor and from said fine driven means, and a stationary and a movable index, the latter being driven from the differential movements of the armature of said coarse repeater motor and said coarse driven means.

In testimony whereof I have affixed my signature.

EARL W. CHAFEE.